United States Patent
Katayama et al.

(10) Patent No.: US 11,618,514 B2
(45) Date of Patent: Apr. 4, 2023

(54) LINK ASSEMBLY AND SEAL ASSEMBLY

(71) Applicant: KOMATSU LTD., Tokyo (JP)

(72) Inventors: Minoru Katayama, Tokyo (JP); Tomoyoshi Sho, Tokyo (JP); Kenichi Hisamatsu, Tokyo (JP)

(73) Assignee: KOMATSU LTD., Tokyo (JP)

( * ) Notice: Subject to any disclaimer, the term of this patent is extended or adjusted under 35 U.S.C. 154(b) by 966 days.

(21) Appl. No.: 16/337,957

(22) PCT Filed: Nov. 30, 2017

(86) PCT No.: PCT/JP2017/043054
§ 371 (c)(1),
(2) Date: Mar. 29, 2019

(87) PCT Pub. No.: WO2018/105487
PCT Pub. Date: Jun. 14, 2018

(65) Prior Publication Data
US 2021/0276639 A1 Sep. 9, 2021

(30) Foreign Application Priority Data
Dec. 6, 2016 (JP) .............................. JP2016-236578

(51) Int. Cl.
*B62D 55/088* (2006.01)
*B62D 55/21* (2006.01)
(Continued)

(52) U.S. Cl.
CPC ......... *B62D 55/0887* (2013.01); *B62D 55/21* (2013.01); *F16J 15/3204* (2013.01); *B62D 55/092* (2013.01)

(58) Field of Classification Search
CPC ................ B62D 55/0887; B62D 55/21; B62D 55/092; F16J 15/3204
See application file for complete search history.

(56) References Cited

U.S. PATENT DOCUMENTS 4,089,531 A * 5/1978 Roley ................ B62D 55/0887
277/380
4,284,281 A * 8/1981 Reinsma ............ B62D 55/0887
277/392
(Continued)

FOREIGN PATENT DOCUMENTS

| CN | 103153765 A | 6/2013 |
| CN | 105473432 A | 4/2016 |

(Continued)

OTHER PUBLICATIONS

The Office Action for the corresponding Chinese application No. 201780062707.7, dated Dec. 2, 2020.
(Continued)

*Primary Examiner* — Jason R Bellinger
(74) *Attorney, Agent, or Firm* — Global IP Counselors, LLP

(57) ABSTRACT

A link assembly includes a first member, a second member opposing the first member and being rotatable around a rotating shaft, a seal housing formed between the first and second members, and a seal assembly disposed inside the seal housing. The seal assembly has a seal ring and a load ring. The seal ring has a support ring and a lip ring. The seal ring is disposed between the first member and the load ring. The load ring is disposed between the seal ring and the second member. The lip ring abuts the load ring. The lip ring has a first lip part that abuts the first member and protrudes in an axial direction of the rotating shaft, and a second lip part that abuts the second member and protrudes in a radial direction perpendicular to the rotating shaft.

12 Claims, 9 Drawing Sheets

(51) Int. Cl.
*F16J 15/3204* (2016.01)
*B62D 55/092* (2006.01)

(56) References Cited

U.S. PATENT DOCUMENTS

| | | | |
|---|---|---|---|
| 5,763,956 | A | 6/1998 | Metz et al. |
| 6,206,491 | B1 | 3/2001 | Hisamatsu |
| 8,721,213 | B2 | 5/2014 | Johannsen et al. |
| 9,126,645 | B2* | 9/2015 | Hasselbusch ......... B62D 55/21 |
| 2003/0219181 | A1 | 11/2003 | Yamamoto et al. |
| 2005/0040708 | A1 | 2/2005 | Yamamoto et al. |
| 2013/0169034 | A1 | 7/2013 | Hisamatsu |
| 2015/0061369 | A1 | 3/2015 | Thorson et al. |

FOREIGN PATENT DOCUMENTS

| | | |
|---|---|---|
| DE | 3040402 A1 | 5/1982 |
| JP | 52-55538 U | 4/1977 |
| JP | 54-6740 U | 1/1979 |
| JP | 54-9431 U | 1/1979 |
| JP | 54-9432 U | 1/1979 |
| JP | 63-162382 A | 7/1988 |
| JP | 2-127855 U | 10/1990 |
| JP | 8-290788 A | 11/1996 |
| JP | 10-167131 A | 6/1998 |
| JP | 11-51196 A | 2/1999 |
| JP | 2002-308162 A | 10/2002 |
| JP | 2004-249973 A | 9/2004 |
| JP | 2010-001932 A | 1/2010 |
| JP | 2012-116363 A | 6/2012 |
| JP | 2013-44380 A | 3/2013 |

OTHER PUBLICATIONS

The Office Action for the corresponding Korean application No. 10-2019-7009483, dated Apr. 21, 2020.
The Office Action for the corresponding German application No. 11 2017 004 593.2, dated Aug. 17, 2022.

* cited by examiner

LINK ASSEMBLY AND SEAL ASSEMBLY

CROSS-REFERENCE TO RELATED APPLICATIONS

This application is a U.S. National stage application of International Application No. PCT/JP2017/043054, filed Nov. 30, 2017. This U.S. National stage application claims priority under 35 U.S.C. § 119(a) to Japanese Patent Application No. 2016-236578, filed in Japan on Dec. 6, 2016. The entire contents of which are hereby incorporated herein by reference.

BACKGROUND

Field of the Invention

The present invention relates to a link assembly and seal assembly.

Background Information

Conventionally, a crawler belt type traveling vehicle such as a bulldozer or a hydraulic excavator is used for work on uneven ground. The crawler belt type traveling vehicle is provided with a crawler belt type travel device configured by crawler belts, a sprocket, an idler, upper wheels, and lower wheels and the like. The crawler belt is wound around the sprocket, the idler, the upper wheel, and the lower wheels. The crawler belt is configured by a plurality of link assemblies which are coupled together.

Japanese Patent Laid-open No. JP 2004-249973 discloses a link assembly having a coupling pin, a pair of outer links, a pair of inner links, and a pair of a fixed bush and a rotating bush. The coupling pin is press-fitted into the outer links. The inner links are attached to the coupling pin via the fixed bush and are able to rotate with the fixed bush around the coupling pin. The rotating bush is disposed on the inside of the pair of inner links in the axial direction, and is able to rotate around the coupling pin.

Japanese Patent Laid-open No. JP H10-167131 discloses a link assembly having a coupling pin, a pair of outer links, a pair of inner links, a fixed bush, a pair of supporting members, and a rotating bush. The inner links are attached to the coupling pin via the fixed bush and the supporting members, and are able to rotate with the supporting members around the fixed bush which is press-fitted to the coupling pin. The rotating bush is disposed toward the pair of supporting members inwardly in the axial direction, and is able to rotate around the fixed bush.

Japanese Patent Laid-open No. JP 2002-308162 discloses a link assembly having a coupling pin, a pair of outer links, a pair of inner links, and a fixed bush. The fixed bush is press-fitted to the inner links and is able to rotate around the coupling pin.

In the above types of link assemblies, a seal assembly is provided between a fixed member and a rotating member that rotates relatively with respect to the fixed member. The seal assembly suppresses the intrusion of earth and sand into the inside of the link assembly and suppresses lubricating oil from leaking out from the inside of the link assembly.

A seal assembly is disclosed in United States Patent U.S. Pat. No. 8,721,213 that has a load ring and a seal ring. The load ring is configured by an elastic material and forms a close contact with a fixed member. A portion of the seal ring forms a close contact with a rotating member by means of a pressing force from the load ring.

SUMMARY

However, because earth and sand that has intruded from the outside comes into direct contact with the load ring in the seal assembly in United States Patent U.S. Pat. No. 8,721,213, the load ring is easily subjected to wear and the durability of the seal assembly is poor.

An object of the present invention is to provide a link assembly and a seal assembly that takes into account the above conditions and with which durability can be improved.

A link assembly according to the present invention is provided with crawler belt links mutually coupled so as to be able to rotate around a rotating shaft, the link assembly further being provided with a first member, a second member, a seal housing, and a seal assembly. The second member opposes the first member and is able to rotate around the rotating shaft. The seal housing is formed between the first member and the second member. The seal assembly is disposed inside the seal housing. The seal assembly has a seal ring and a load ring. The seal ring has a support ring and a lip ring and is disposed between the first member and the load ring. The load ring is disposed between the seal ring and the second member. The lip ring has a first lip part that abuts the first member and protrudes in the axial direction of the rotating shaft, and a second lip part that abuts the second member and protrudes in a radial direction perpendicular to the rotating shaft. The lip ring abuts the load ring.

According to the ring assembly of the present invention, lubricating oil is suppressed from leaking out from the inside by the first lip part, and earth and sand that intrude from a gap between the first member and the second member can be suppressed from coming into contact with the load ring by the second lip part. As a result, the formation of a gap that would become a leakage route for the lubricating oil between the load ring and the seal ring due to wear on the load ring can be suppressed and therefore the durability of the seal assembly can be improved.

A seal assembly according to the present invention is for sealing a joint that has a rotating shaft of crawler belt links, and is provided with a load ring and a seal ring. The seal ring has a lip ring and a support ring. The seal ring includes a first lip part that is located on the lip ring and protrudes in an axial direction of the rotating shaft, a second lip part that is located on the lip ring and protrudes in a radial direction perpendicular to the rotating shaft, and an opposing surface that opposes the load ring and has a C-shaped cross-section. The lip ring abuts the load ring. The opposing surface includes a first opposing surface that extends in the axial direction, a second opposing surface that is continuous with the first opposing surface and is slanted with respect to the first opposing surface, and a third opposing surface that is continuous with the second opposing surface and opposes the first opposing surface.

According to the seal assembly of the present invention, a counterforce produced when the load ring is compressed can be transmitted to the first lip part via the second opposing surface, and can be transmitted to the second lip part via the third opposing surface. Therefore, the load ring can be protected by the second lip part and the durability of the seal assembly can be improved.

According to the present invention, a link assembly and a seal assembly can be provided that can improve durability.

DETAILED DESCRIPTION OF EMBODIMENT(S)

(Configuration of Crawler Belt Type Travel Device 1)

Figure 1:
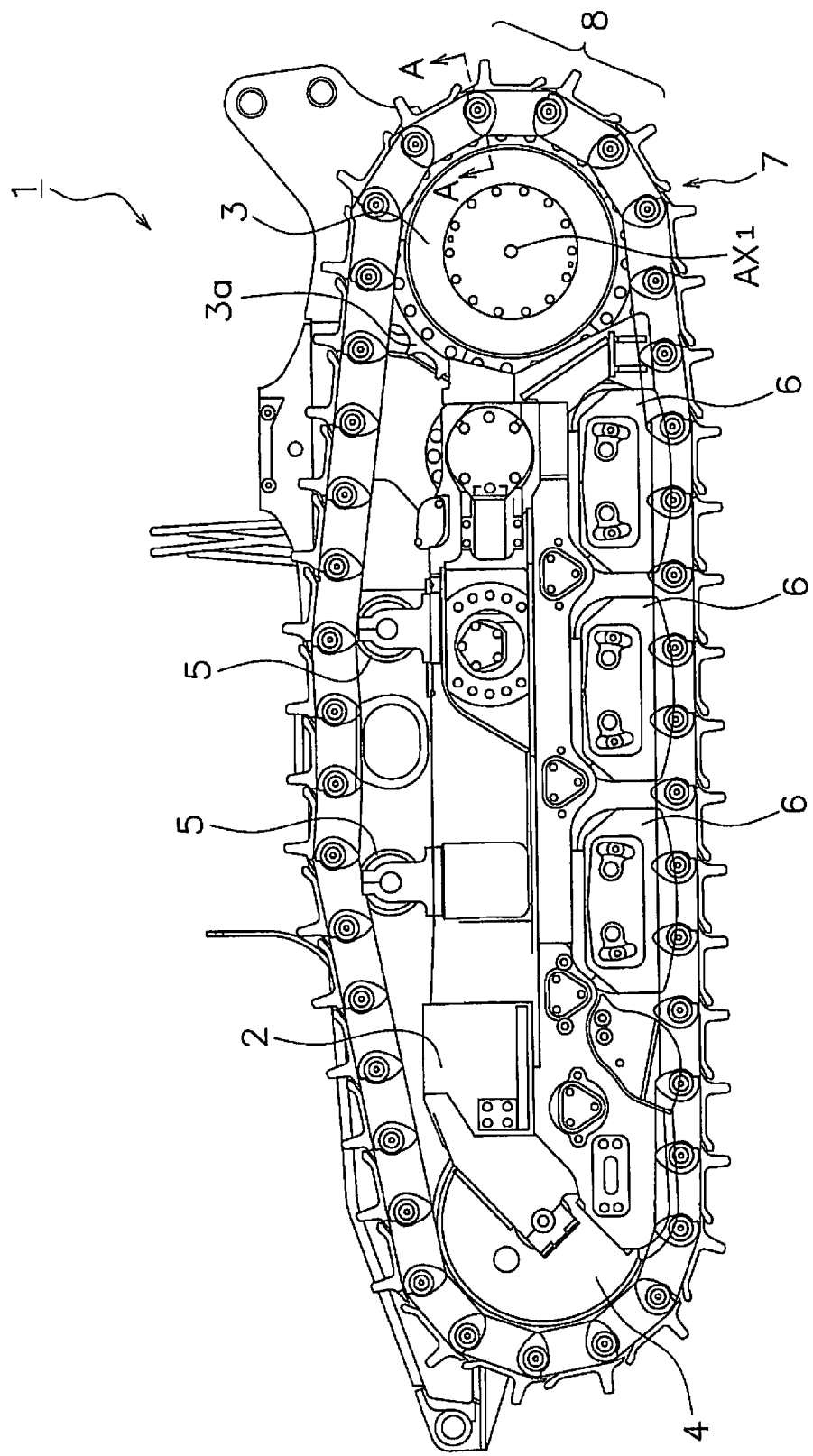
FIG. 1 is a side view of a crawler belt type travel device according to an embodiment.

Hereinbelow, a configuration of a crawler belt type travel device 1 will be discussed with reference to the drawings. FIG. 1 is a side view of the crawler belt type travel device 1. The crawler belt type travel device 1 is used as a travel device of a crawler belt type travel vehicle such as a bulldozer or a hydraulic excavator, or the like.

The crawler belt type travel device 1 has a track frame 2, a sprocket 3, an idler 4, upper wheels 5, lower wheels 6, and a crawler belt 7.

The track frame 2 configures a framework of the crawler belt type travel device 1. The sprocket 3 is a drive wheel that rotates around an axis AX1. The sprocket 3 has teeth 3a that mesh with the crawler belt 7. The idler 4 is attached to the front end part of the track frame 2.

The upper wheels 5 are attached to the upper surface of the track frame 2. The upper wheels 5 support the crawler belt 7 from below so that the crawler belt 7 does not fall downward under its own weight. The lower wheels 6 are attached to the lower surface of the track frame 2. The lower wheels 6 distribute the vehicle body weight and transfer the vehicle body weight to the crawler belt 7.

The crawler belt 7 is wound around the sprocket 3, the idler 4, the upper wheels 5, and the lower wheels 6. The crawler belt 7 meshes with the teeth 3a of the sprocket 3. The crawler belt 7 is driven with the driving power of the sprocket 3. The crawler belt 7 is configured by a plurality of link assemblies 8 which are coupled together multiply in an endless state. The plurality of link assemblies 8 are coupled together and form a link chain. The link assemblies 8 are sub-assemblies that configure portions of the crawler belt 7.

(Configuration of Link Assembly 8)

Figure 2:
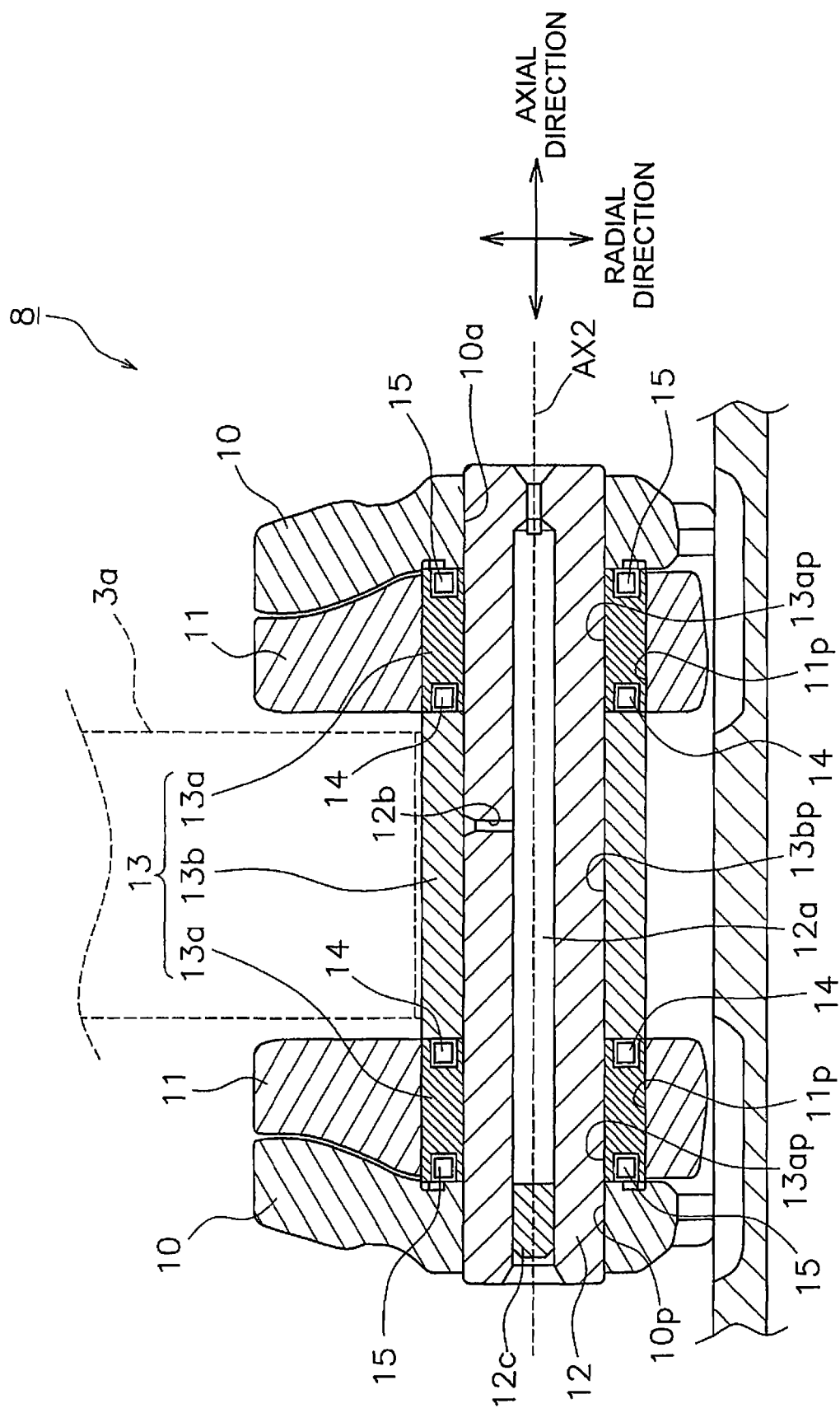
FIG. 2 is a sectional view A-A in FIG. 1.

FIG. 2 is a cross-sectional view A-A in FIG. 1. The link assembly 8 is provided with a pair of outer links (first links) 10, a pair of inner links (second links) 11, a coupling pin 12, a bush 13, a pair of inner seal assemblies 14, and a pair of outer seal assemblies 15. The link assembly 8 is a joint that couples the outer links 10 and the inner links 11 so as to be able to rotate relatively around an axis AX2 (rotating shaft). The outer links 10 and the inner links 11 are crawler belt links coupled by the joint.

The pair of outer links 10 are disposed in left-right symmetry. The outer links 10 each have a coupling pin hole 10p which is an insertion hole into which the coupling pin 12 is press-fitted. The outer links 10 are fixed to the coupling pin 12. The pair of inner links 11 are disposed on the inside of the pair of outer links 10 in a direction (hereinbelow referred to as "axial direction") parallel to the axis AX2 of the coupling pin 12. The inner links 11 each have a bush hole 11p which is an insertion hole into which the bush 13 is press-fitted. The inner links 11 are able to rotate with the bush 13 around the coupling pin 12. The inner links 11 are able to rotate with the bush 13 around the axis AX2 (rotating shaft) of the coupling pin 12.

The coupling pin 12 has a rod shape. The coupling pin 12 is inserted through the outer links 10, the inner links 11, the bush 13, the inner seal assemblies 14, and the outer seal assemblies 15. The coupling pin 12 is disposed along the axis AX2. The center axis of the outer seal assemblies 15 is the same as the axis AX2 of the coupling pin 12. Both end parts of the coupling pin 12 are press-fitted into the coupling pin hole 10p of the outer links 10.

The coupling pin 12 has a lubricating oil injection hole 12a and a lubricating oil supply hole 12b. The lubricating oil injection hole 12a is formed along the axis AX2. One end of the lubricating oil injection hole 12a is closed by a plug 12c. The lubricating oil supply hole 12b is formed in a middle part in the axial direction of the coupling pin 12. The lubricating oil supply hole 12b is formed in the vertical direction (hereinbelow, referred to as "radial direction") relative to the axial direction. One end of the lubricating oil supply hole 12b opens to the lubricating oil injection hole 12a. The other end of the lubricating oil supply hole 12b opens toward the bush 13. Lubricating oil injected into the lubricating oil injection hole 12a is supplied to a gap between the coupling pin 12 and the bush 13 via the lubricating oil supply hole 12b.

The bush 13 includes a pair of fixed bushes 13a (first bush) and a rotating bush 13b (second bush). The fixed bushes 13a are cylindrical bodies that extend in the axial direction. The fixed bushes 13a are press-fitted into bush holes 11p of the inner links 11. The fixed bushes 13a are provided with through-holes 13bp through which the coupling pin 12 passes. The rotating bush 13b is a cylindrical body that extends in the axial direction. The rotating bush 13b is disposed inside the pair of fixed bushes 13a in the axial direction. The rotating bush 13b meshes with the teeth 3a of the sprocket 3. The rotating bush 13b is provided with a through-hole 13bp through which the coupling pin 12 passes. The rotating bush 13b is rotatably supported on the coupling pin 12.

The pair of inner seal assemblies 14 each form a seal around the joint. The pair of inner seal assemblies 14 each seal the gap 33 between the fixed bushes 13a and the rotating bush 13b. The pair of inner seal assemblies 14 are disposed on both sides of the rotating bush 13b in the axial direction. The inner seal assemblies 14 are annular bodies centered on the axis AX2 of the coupling pin 12. The inner seal assemblies 14 suppress the intrusion of earth and sand from the gap 33 between the fixed bushes 13a and the rotating bush 13b, and suppress the lubricating oil from leaking out from the inside. In particular, because the earth and sand easily enters the gap 33 between the fixed bushes 13a and the rotating bush 13b when earth and sand is pressed by the teeth 3a of the sprocket 3, the inner seal assemblies 14 effectively suppress the intrusion of such earth and sand.

The pair of outer seal assemblies 15 each form a seal around the joint. The pair of outer seal assemblies 15 each seal the gap between the fixed bushes 13a and the outer links 10. The pair of outer seal assemblies 15 are disposed on the outside of the fixed bushes 13a in the axial direction. The outer seal assemblies 15 are annular bodies centered on the axis AX2 of the coupling pin 12. The outer seal assemblies 15 suppress the intrusion of earth and sand from the gap between the fixed bushes 13a and the outer links 10, and suppress the lubricating oil from leaking out from the inside.
(Configuration of Inner Seal Assemblies 14 and Outer Seal Assemblies 15)

A configuration of the inner seal assemblies 14 and the outer seal assemblies 15 will be discussed next. Because the inner seal assemblies 14 and the outer seal assemblies 15 have the same configuration, the inner seal assemblies 14 will mainly be discussed below.

Figure 3:
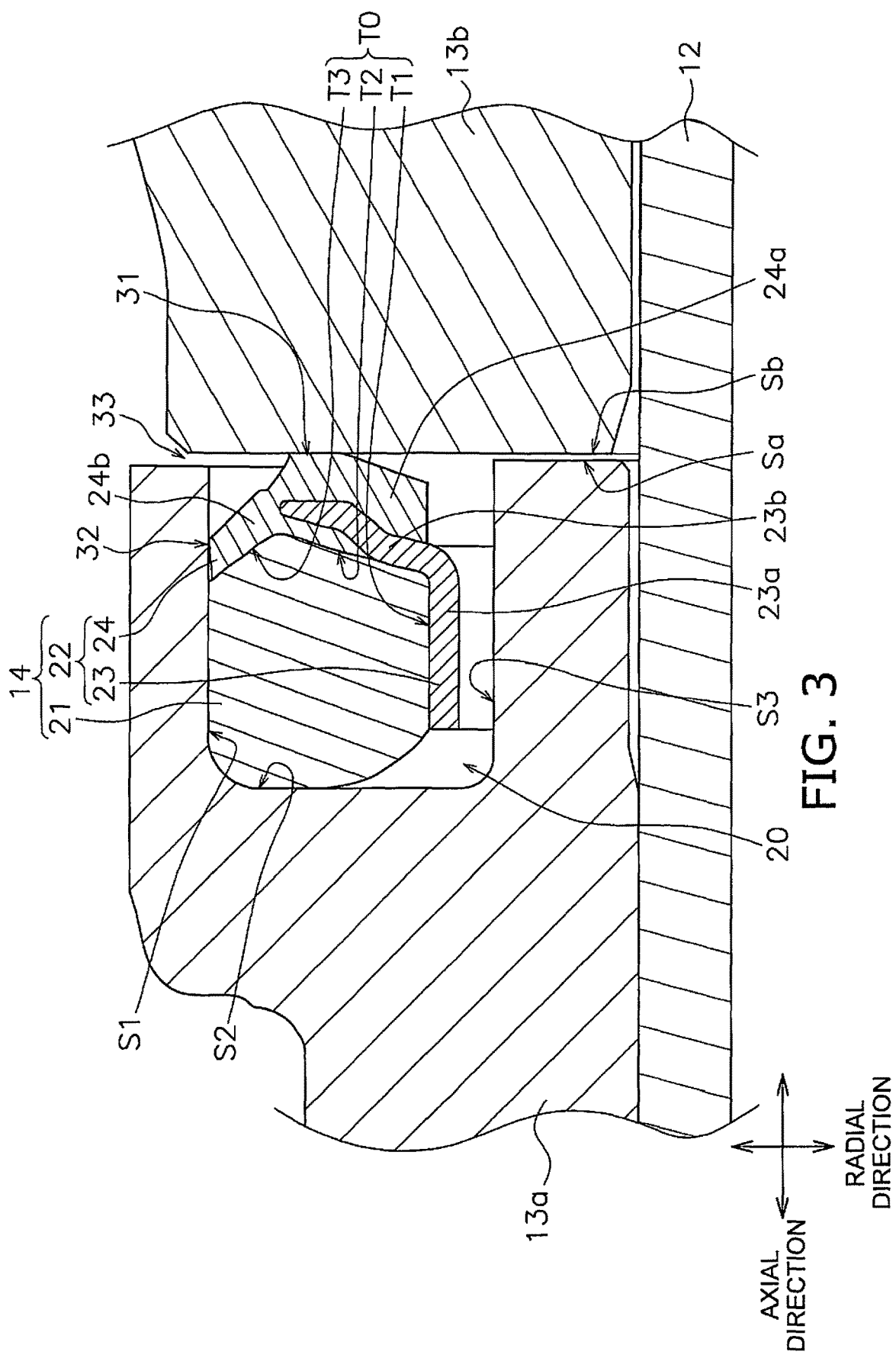
FIG. 3 is an enlarged view of a portion of FIG. 2.
Figure 4:
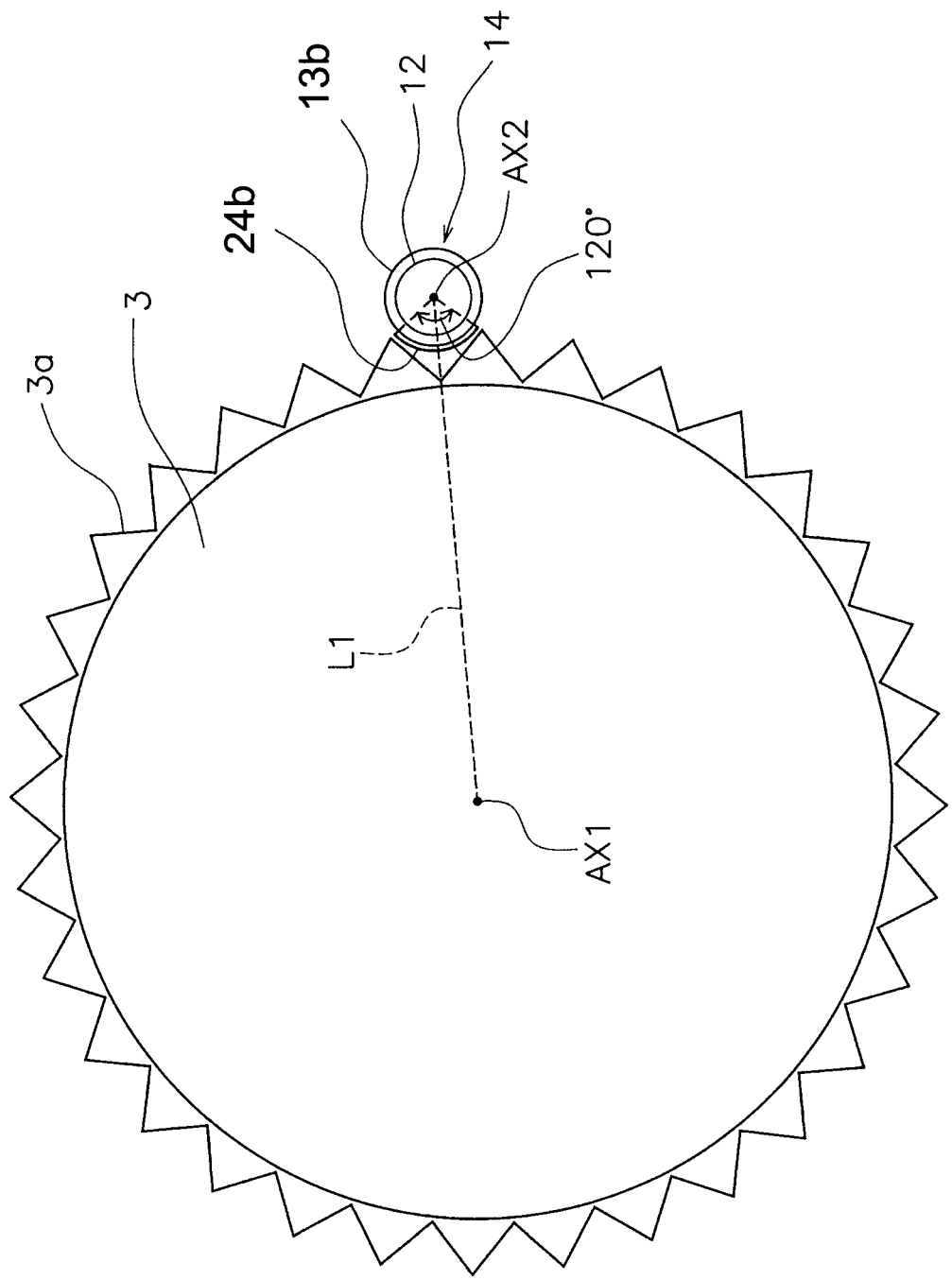
FIG. 4 is a side view schematically illustrating the positional relationship between a sprocket, a coupling pin, and a seal assembly.

FIG. 3 is an enlarged view of a portion of FIG. 2. FIG. 4 is a side view schematically illustrating the positional relationship between the sprocket 3, the coupling pin 12, and the inner seal assembly 14.

As illustrated in FIG. 3, each inner seal assembly 14 is disposed inside a seal housing 20. Each seal housing 20 is formed between a fixed bush 13a and a rotating bush 13b that oppose each other. In the present embodiment, the seal housings 20 are formed on outer surfaces Sa of the fixed bushes 13a. The outer surfaces Sa of the fixed bushes 13a are end surfaces that oppose an outer surface Sb of the rotating bush 13b. The seal housings 20 are formed in an annular shape centered on the axis AX2 of the coupling pin 12. The seal housings 20 are annular recessed parts that are formed on the end surfaces of the fixed bushes 13a.

In the present embodiment, the cross-section of the seal housings 20 has a rectangular shape. Each seal housing 20 has a first inner surface S1, a second inner surface S2, and a third inner surface S3. The first inner surface S1 extends in the axial direction. The second inner surface S2 extends in the radial direction from one end of the first inner surface S1 in the axial direction. The third inner surface S3 opposes the first inner surface S1. The third inner surface S3 extends in the radial direction from one end of the second inner surface S2. The cross-sectional shape of the seal housings 20 is not limited to a rectangular shape.

The lubricating oil fills in a space on the coupling pin 12 side of the inner seal assemblies 14 within the seal housing 20. The inner seal assemblies 14 each have a load ring 21 and a seal ring 22.

The load ring 21 is formed in an annular shape centered on the axis AX2 of the coupling pin 12. The load ring 21 is configured by an elastic material. For example, nitrile rubber (NBR) having a hardness of 60 to 70 may be used as the elastic material.

The load ring 21 is disposed in a compressed state between the seal ring 22 and the seal housing 20. The load ring 21 is pressed against the first inner surface S1 and the second inner surface S2 of the seal housing 20.

The seal ring 22 is formed in an annular shape centered on the axis AX2 of the coupling pin 12. The seal ring 22 is disposed so as to enfold the load ring 21. In the present embodiment, the cross-sectional shape of the seal ring 22 has a C shape but the cross-sectional shape is not limited thereto.

The seal ring 22 is disposed between the load ring 21 and the rotating bush 13b. The seal ring 22 is able to move in the axial direction so as to follow the rotating bush 13b due to the counterforce from the compressed load ring 21.

The seal ring 22 has an opposing surface T0 that opposes the load ring 21. The cross-sectional shape of the opposing surface T0 is substantially formed in a C shape (a reverse C-shape is illustrated in FIG. 3). The opposing surface T0 includes a first opposing surface T1, a second opposing surface T2, and a third opposing surface T3.

The first opposing surface T1 extends in the axial direction. The second opposing surface T2 is joined to the first opposing surface T1 and is inclined with respect to the first opposing surface T1. The second opposing surface T2 extends in a direction (approximate radial direction) that crosses the axial direction. The second opposing surface T2 does not oppose the first opposing surface T1 or the third opposing surface T3. The third opposing surface T3 is joined to the second opposing surface T2 and opposes the first opposing surface T1. The third opposing surface T3 is inclined with respect to the second opposing surface T2.

In the present embodiment, two surfaces which "oppose each other" does not only refer to a case in which one surface and the other surface face each other directly, but also includes a case in which a line perpendicular to the one surface crosses the other surface.

The seal ring 22 has a support ring 23 and a lip ring 24.

The support ring 23 supports the load ring 21 and the lip ring 24. The support ring 23 is configured with a material (for example, a metallic material such as a rolled steel plate, etc.) harder than that of the load ring 21. The cross-sectional shape of the support ring 23 forms an approximate L shape.

The support ring 23 includes a first part 23a and a second part 23b. The first part 23a is a plate-like portion that extends in the axial direction. The first part 23a configures the first opposing surface T1. The second part 23b is a plate-like portion that extends to the outside in the radial direction from one end of the first part 23a in the axial direction. A large portion of the second part 23b is inserted into the lip ring 24. The second part 23b is disposed inside the lip ring 24. The surface of the second part 23b opposing the load ring 21 and the surface on the opposite side of the opposing surface, are covered by the lip ring 24. The second part 23b configures a portion of the second opposing surface T2.

The lip ring 24 is supported by the support ring 23. The lip ring 24 includes a body part 24a and an extending part 24b. The lip ring 24 is made up of an elastic material. The elastic material is, for example, polyurethane (PU). The lip ring 24 is provided with a first lip part 31 that protrudes in the axial direction and a second lip part 32 that protrudes in the radial direction. The lip ring 24 abuts the load ring 21.

The body part 24a configures a portion of the second opposing surface T2 that abuts the load ring 21. The body part 24a is pressed against the outer surface Sb of the rotating bush 13b due to the counterforce produced by the compressed load ring 21.

The body part 24a has the first lip part 31 that abuts the outer surface Sb of the rotating bush 13b. The first lip part 31 is the portion of the seal ring 22 that extends the most toward the rotating bush 13b side. As illustrated in FIG. 4, the body part 24a is formed in an annular shape centered on the axis AX2 of the coupling pin 12, and the first lip part 31 is also formed in an annular shape centered on the axis AX2 of the coupling pin 12. The first lip part 31 is provided over the entire circumference in the circumferential direction centered on the axis AX2 of the coupling pin 12.

Earth and sand that has intruded from the gap 33 between the fixed bushes 13a and the rotating bush 13b can be suppressed from entering the coupling pin 12 side of the inner seal assemblies 14 due to the close contact of the first lip part 31 to the outer surface Sb. As a result, lubricity between the fixed bushes 13a and the rotating bush 13b can be maintained.

The extending part 24b is joined to the outside of the body part 24a in the radial direction. In the present embodiment, the extending part 24b is integrally formed with the body part 24a. The extending part 24b configures the third opposing surface T3 that abuts the load ring 21. The extending part 24b is pressed against the first inner surface S1 of the seal housing 20 by the counterforce produced by the compressed load ring 21.

The extending part 24b has the second lip part 32 that abuts the first inner surface S1. The second lip part 32 is the portion of the seal ring 22 that extends the furthest to the outside in the radial direction. As illustrated in FIG. 4, the extending part 24b is formed in an arc shape centered on the axis AX2 of the coupling pin 12, and the second lip part 32 is also formed in an arc shape centered on the axis AX2 of the coupling pin 12. The second lip part 32 is provided only for a portion along the circumferential direction centered on the axis AX2 of the coupling pin 12. The load ring 21 directly supports the lip ring 24 and suppresses deformation of the second lip part 32.

As illustrated in FIG. 4, when the rotating bush 13b is positioned so as to be engaged with the sprocket 3, the second lip part 32 is disposed in a position that, as seen in the axis AX1 or axis AX2 direction, crosses a coupling line L1 that links the axis AX1 of the sprocket 3 and the axis AX2 of the coupling pin 12. The second lip part 32 is disposed so as to cover a region opposing the teeth 3a of the sprocket 3 as seen in a side view. Specifically, the second lip part 32 is disposed in a range of 120° that is spread 60° on either side of the coupling line L1 and centered on the axis AX2 of the coupling pin 12.

In this way, contact between the load ring 21 and earth and sand can be suppressed more effectively because the second lip part 32 is provided in a region, within the seal housing 20, in which the earth and sand pressed by the teeth 3a of the sprocket 3 can easily intrude.

Although the configuration of the inner seal assemblies 14 has been discussed above, the outer seal assemblies 15 have the same configuration as the inner seal assemblies 14. The main differences between the inner seal assemblies 14 and the outer seal assemblies 15 are that the outer seal assemblies 15 are disposed in an inverted state in the axial direction in relation to the configuration disposition of the inner seal assemblies 14, and the outer seal assemblies 15 form seals between the fixed bushes 13a and the outer links 10 while the inner seal assemblies 14 form seals between the rotating bush 13b and the inner links 11.

(Elemental Configurations of Inner Seal Assemblies 14 and Outer Seal Assemblies 15)

Figure 5:
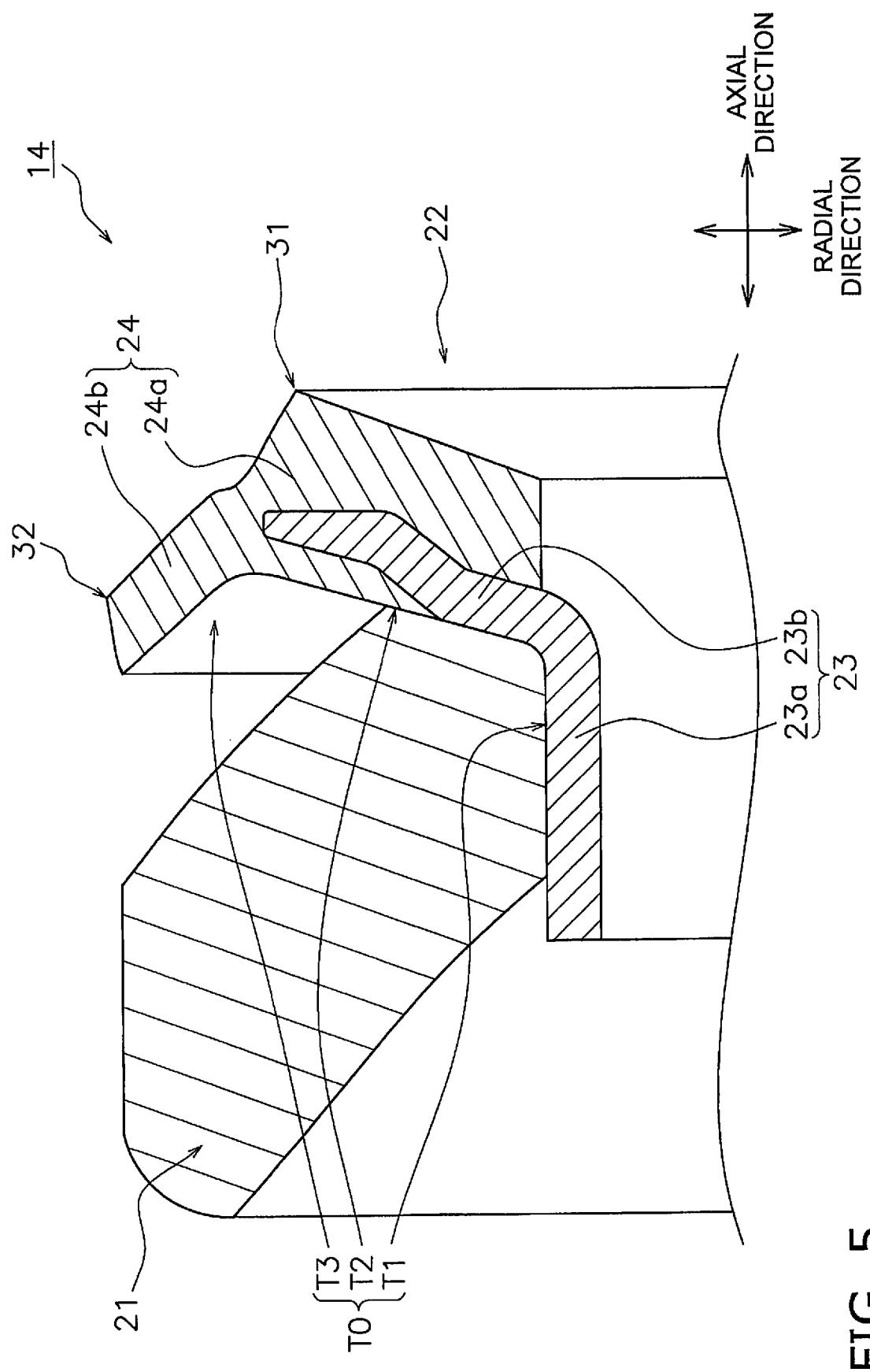
FIG. 5 is a cross-sectional perspective view of the seal assembly.

An elemental configuration of the inner seal assemblies 14 and the outer seal assemblies 15 will be discussed next. Because the inner seal assemblies 14 and the outer seal assemblies 15 have the same configuration, the elemental configuration of an inner seal assembly 14 will be discussed below. FIG. 5 is a cross-sectional perspective view of the inner seal assembly 14 before being accommodated inside the seal housing 20.

The load ring 21 is not compressed and therefore extends farther in comparison to the state illustrated in FIG. 3. The load ring 21 is affixed to a portion of the first opposing surface T1 and a portion of the second opposing surface T2 of the seal ring 22. The load ring 21 is not affixed to the remaining portion of the second opposing surface T2 or to the third opposing surface T3 of the seal ring 22, and is spaced away from said surfaces.

The configuration of the seal ring 22 is approximately the same as the accommodated configuration illustrated in FIG. 3. The seal ring 22 has the opposing surface T0 which has a C-shaped cross-section and opposes the load ring 21. The opposing surface T0 includes the first opposing surface T1, the second opposing surface T2, and the third opposing surface T3.

The first opposing surface T1 extends in the axial direction. The second opposing surface T2 is joined to the first opposing surface T1 and is inclined with respect to the first opposing surface T1. The third opposing surface T3 is joined to the second opposing surface T2 and opposes the first opposing surface T1.

The lip ring 24 of the seal ring 22 is formed in an annular shape centered on the center axis (same as the axis AX2 of the coupling pin 12) of the seal ring 22. The first lip part 31 of the body part 24a within the lip ring 24 is formed in an annular shape centered on the center axis of the seal ring 22. The first lip part 31 protrudes in the axial direction of the seal ring 22. The first lip part 31 is the portion of the seal ring 22 that protrudes the furthest in the axial direction. The first lip part 31 is positioned on the opposite side of the load ring 21 in relation to the second opposing surface T2. The first lip part 31 is positioned on the opposite side of the second lip part 32 in relation to the second opposing surface T2.

The second lip part 32 of the body part 24a within the lip ring 24 is formed in an arc shape centered on the center axis of the seal ring 22. The second lip part 32 protrudes in the radial direction of the seal ring 22. The second lip part 32 is the portion of the seal ring 22 that protrudes the furthest in the radial direction. The second lip part 32 is positioned on the same side as the load ring 21 in relation to the second opposing surface T2. The second lip part 32 is positioned on the opposite side of the first lip part 31 in relation to the second opposing surface T2.

The radial direction is a direction perpendicular to the center axis of the seal ring 22 and is the same as the radial direction illustrated in FIG. 3.

(Characteristics)

(1) The link assembly 8 is provided with the inner seal assemblies 14 (example of a seal assembly) disposed in the seal housing 20 formed between the rotating bush 13b (example of a first member) and the fixed bushes 13a (example of a second member) which oppose each other. The inner seal assemblies 14 each have the load ring 21 and the seal ring 22. The load ring 21 is disposed between the seal ring 22 and the fixed bush 13a. The seal ring 22 includes the first lip part 31 that abuts the rotating bush 13b, and the second lip part 32 that abuts the fixed bush 13a.

Therefore, the leakage of lubricating oil from the inside can be suppressed by the first lip part 31 and the earth and sand that has intruded from the gap 33 between the rotating bush 13b and the fixed bushes 13a can be suppressed from coming into contact with the load ring 21. As a result, the formation of a gap that would become a leakage route for the lubricating oil between the load ring 21 and the seal ring 22 due to wear on the load ring 21 can be suppressed and therefore the durability of the inner seal assemblies 14 can be improved.

(2) When the rotating bush 13b is engaged with the sprocket 3, the second lip part 32 crosses the coupling line L1 that links the axis AX1 of the sprocket 3 and the axis AX2 of the coupling pin 12 as seen from the side.

In this way, contact between the load ring 21 and the earth and sand can be more effectively suppressed because the second lip part 32 is disposed in a region, within the seal housing 20, in which the earth and sand pressed by the teeth 3a of the sprocket 3 can easily intrude.

(3) The inner seal assemblies 14 (example of a seal assembly) each have the load ring 21 and the seal ring 22. The seal ring 22 has the opposing surface T0, which has a C-shaped cross-section that opposes the first lip part 31 and that protrudes in the axial direction, the second lip part 32 that protrudes in the radial direction, and the load ring 21. The opposing surface T0 includes the first opposing surface T1 that extends in the axial direction, the second opposing surface T2 that is joined to the first opposing surface T1 and that is inclined with respect to the first opposing surface T1, and the third opposing surface T3 that is joined to the second opposing surface T2 and opposes the first opposing surface T1.

Therefore, the counterforce that is produced when the load ring 21 is compressed is transmitted via the second opposing surface T2 to the first lip part 31 and via the third opposing surface T3 to the second lip part 32. As a result, the first lip part 31 is able to form close contact with the rotating bush 13b and the second lip part 32 is able to form close contact with the fixed bush 13a. Therefore, the load ring 21 can be protected by the second lip part 32 and the durability of the inner seal assemblies 14 can be improved.

(4) The first lip part 31 is positioned on the opposite side of the load ring 21 in relation to the second opposing surface T2, and the second lip part 32 is positioned on the same side as the load ring 21 in relation to the second opposing surface T2.

Therefore, the counterforce produced by the load ring 21 can be used while divided in two directions toward the first lip part 31 and toward the second lip part 32.

(5) The first lip part 31 is formed in an annular shape and the second lip part 32 is formed in an arc shape. Therefore, in particular, only the region where the earth and sand can intrude easily is protected by the second lip part 32, and costs can be reduced while improving the durability of the inner seal assemblies 14.

(Other Embodiments)

Although one embodiment of the present invention has been described so far, the present invention is not limited to the above embodiment and various modifications may be made within the scope of the invention.

Figure 6:
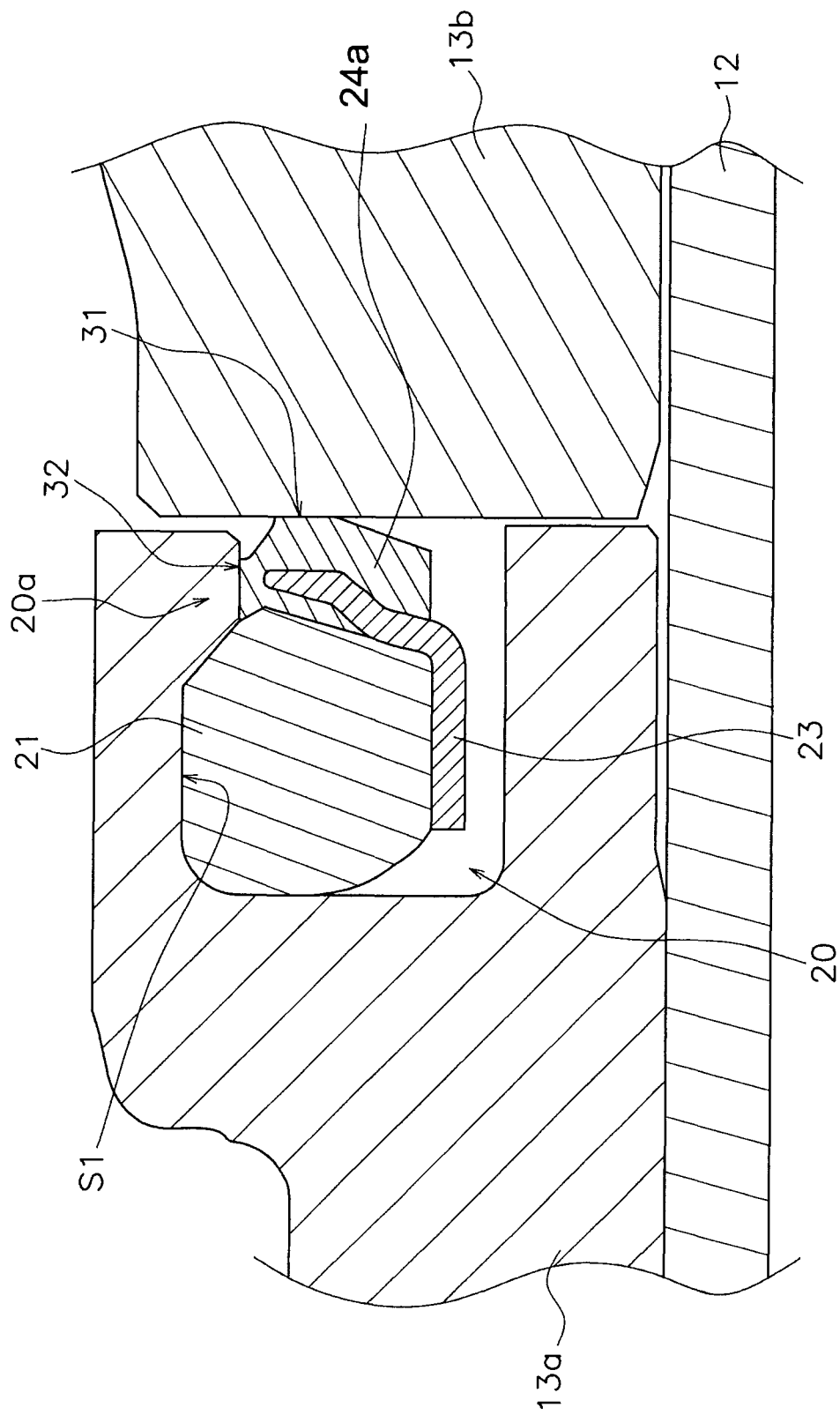
FIG. 6 is a cross-sectional view illustrating another configuration of the seal assembly.
Figure 7:
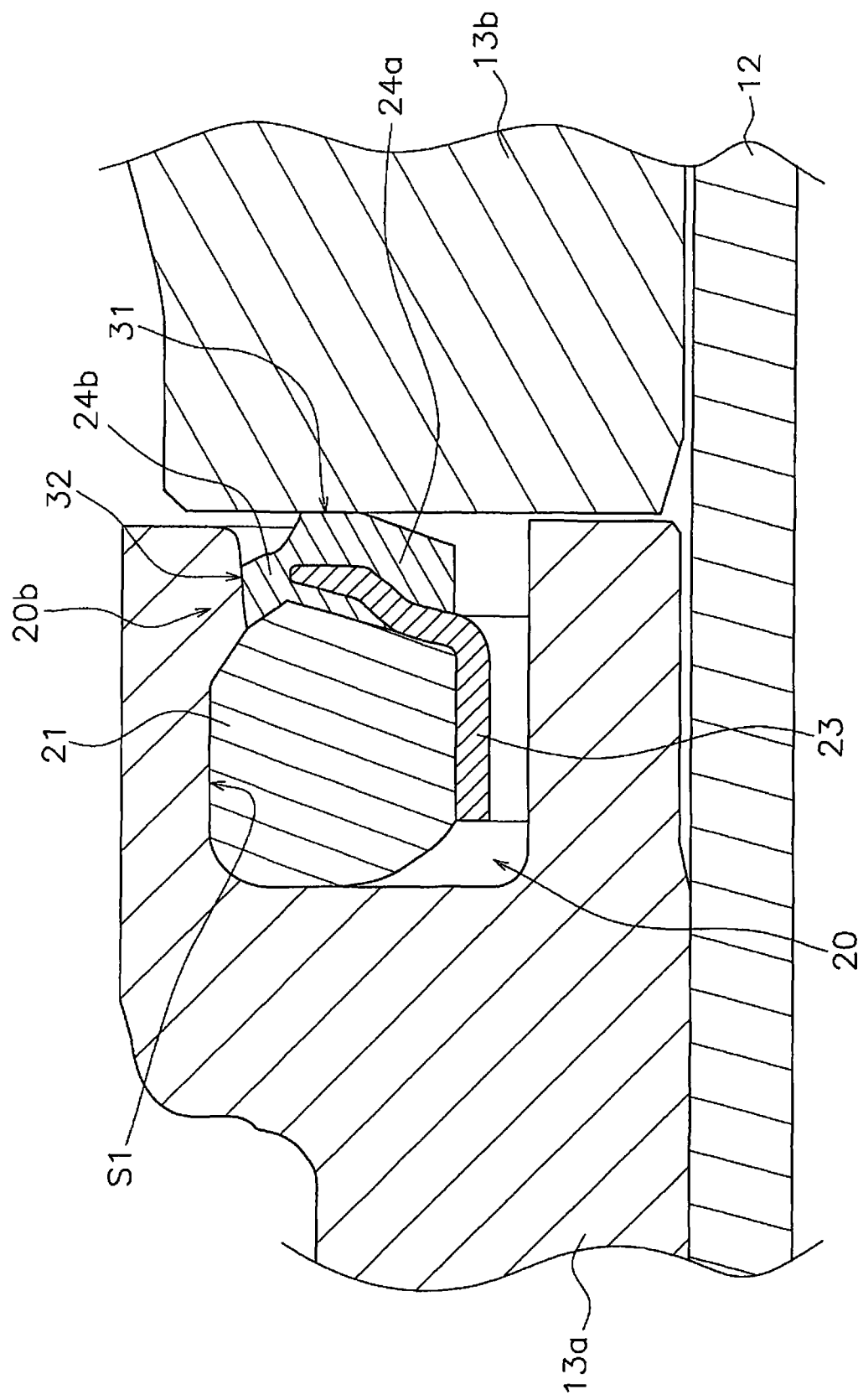
FIG. 7 is a cross-sectional view illustrating another configuration of the seal assembly.

While the first inner surface S1 of the seal housing 20 in the above embodiment is flat, the present invention is not limited in this way. As illustrated in FIG. 6, when the fixed bush 13a has a relatively large first protruding part 20a that protrudes toward the axis AX2 in the radial direction inside the seal housing 20, the body part 24a of the lip ring 24 may have a second lip part 32 that abuts the first protruding part 20a. In this case, a conventionally known seal assembly may be used as-is as the inner seal assembly 14. Additionally, as illustrated in FIG. 7, when the fixed bush 13a has a relatively small second protruding part 20b that protrudes toward the axis AX2 in the radial direction inside the seal housing 20, the extending part 24b may have the second lip part 32 that abuts the second protruding part 20b.

Figure 8:
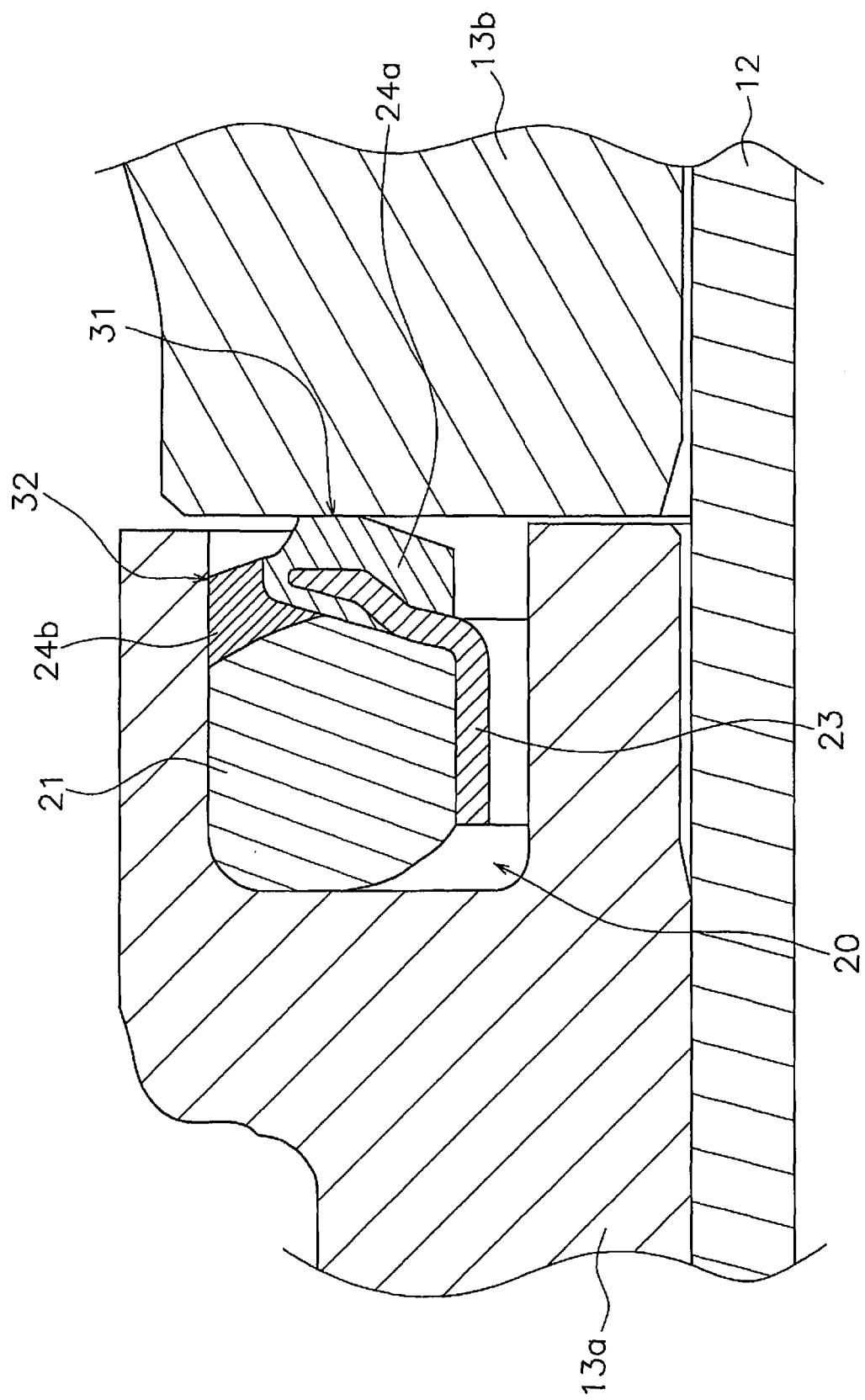
FIG. 8 is a cross-sectional view illustrating another configuration of the seal assembly.

Although the body part 24a and the extending part 24b that configure the lip ring 24 of the seal ring 22 are formed integrally in the above embodiment, the body part 24a and the extending part 24b may be formed as separate members as illustrated in FIG. 8. In this case, the hardness of the extending part 24b can be adjusted individually and the adhesion force of the second lip part 32 with respect to the fixed bushes 13a can be adjusted. For example, if the counterforce produced by the compressed load ring 21 is large, the extending part 24b can be configured with a relatively softer material and the adhesion force of the second lip part 32 can be reduced, whereby wear of the second lip part 32 can be suppressed. Alternatively, if the counterforce produced by the compressed load ring 21 is small, the extending part 24b can be configured with a relatively harder material and the adhesion force of the second lip part 32 can be improved. In the example illustrated in FIG. 8, the support ring 23 and the body part 24a of the lip ring 24 configure a "first seal ring," and the extending part 24b of the lip ring 24 configures a "second seal ring."

Although the extending part 24b of the lip ring 24 and the second lip part 32 of the seal ring 22 are formed as an arc in the above embodiment, both members may be formed in an annular shape.

Although the seal ring 22 is configured by the support ring 23 and the lip ring 24 which are separate members in the above embodiment, the seal ring 22 may be configured by a single member. In this case, all of the seal ring 22 may be configured with the material of the support ring 23, or may be configured with the material of the lip ring 24.

Although the seal housing 20 that accommodates the inner seal assembly 14 is formed in the fixed bushes 13a in the above embodiment, the present invention is not limited in this way. The seal housing 20 may be formed in the rotating bush 13b, or may be formed so as to straddle both the fixed bush 13a and the rotating bush 13b.

The inner seal assemblies 14 are used in the seal between the fixed bushes 13a and the rotating bush 13b and the outer seal assemblies 15 are used in the seal between the fixed bushes 13a and the outer links 10 in the above embodiment. The seal assembly according to the present invention can be used in a seal between a first member and a second member in which any two members opposing each other among the outer links, the inner links, and at least one of the bushes serve as the first member and the second member. For example, the seal assembly according to the present invention tan be used in a seal between the outer link 10 and the outer link 11, and a seal between the inner link 11 and the rotating bush 13b, and the like. In relation to the inner seal assemblies 14 in the above embodiment, the rotating bush 13b is the first member and the fixed bush 13a is the second member. In relation to the outer seal assemblies 15, the outer link 10 is the first member and the fixed bush 13a is the second member.

Figure 9:
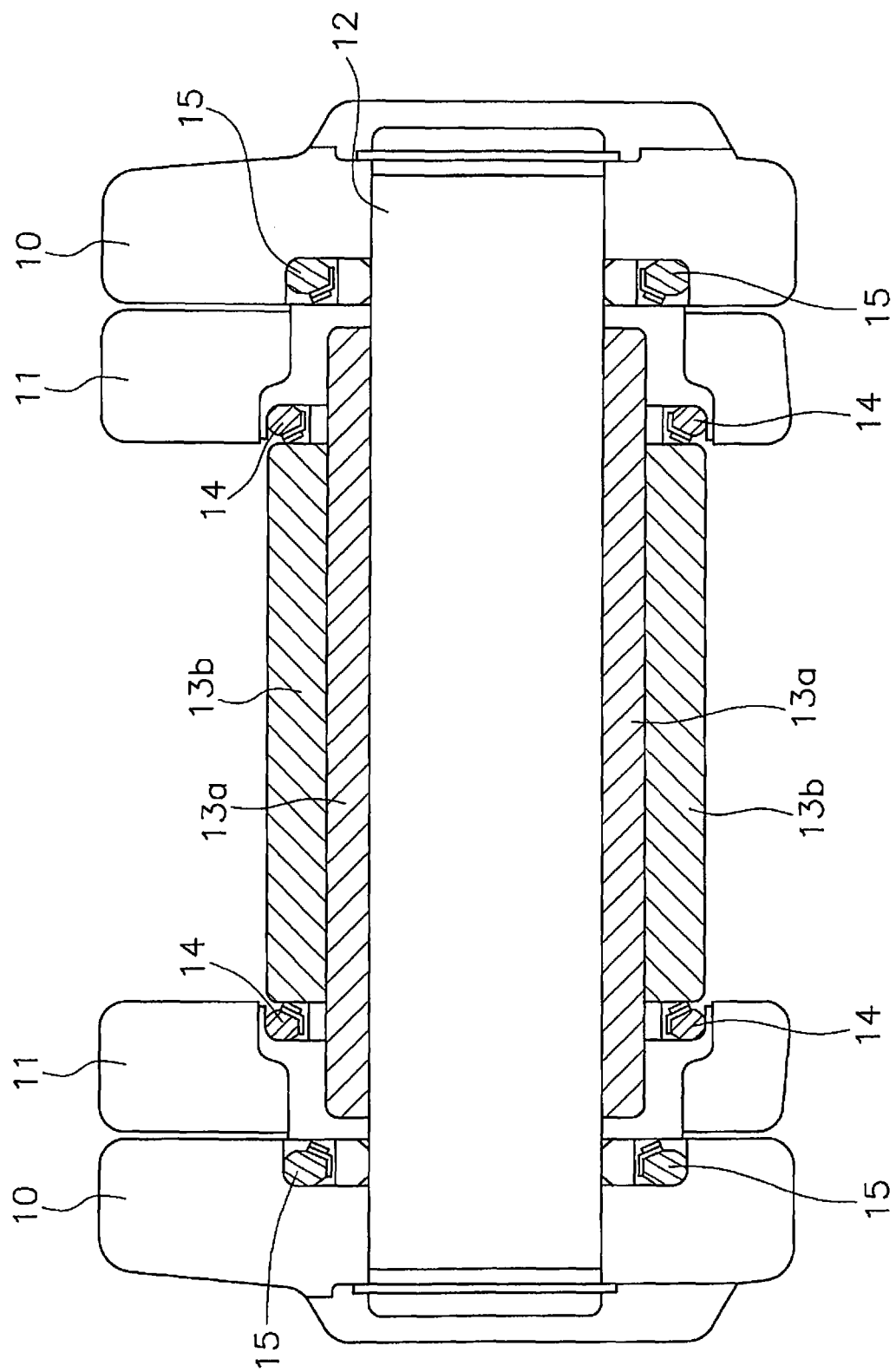
FIG. 9 is a cross-sectional view illustrating another configuration of the seal assembly.

Although the above embodiment discusses a configuration of the link assembly 8 while referring to FIG. 2, the seal assembly according to the present invention can be used in various types of conventional link assemblies. For example, the seal assembly can be applied to a type of link assembly in which a rotating bush is attached to the outer circumference of a fixed bush as disclosed in Patent Document No. 2 (JP H10-167131) (see FIG. 9), or to a link assembly provided with a fixed bush and not provided with a rotating bush as disclosed in Patent Document No. 3 (JP 2002-308162). In the case of the former, the seal assembly according to the present invention is disposed between the outer link and the fixed bush and between the fixed bush and the rotating bush. In the case of the latter, the seal assembly according to the present invention is disposed between the outer link and the fixed bush.

The invention claimed is:

1. A link assembly provided with crawler belt links mutually coupled so as to be rotatable around a rotating shaft, the link assembly comprising:
   a first member;
   a second member opposing the first member;
   a seal housing formed between the first member and the second member; and a seal assembly disposed inside the seal housing, the seal assembly having a seal ring and a load ring, the seal ring having a support ring and a lip ring, and the seal ring being disposed between the first member and the load ring, the load ring being disposed between the seal ring and the second member, and the lip ring abutting the load ring, and the lip ring having
- a first lip part that abuts the first member and protrudes in an axial direction of the rotating shaft, and
- a second lip part that abuts the second member and protrudes in a radial direction perpendicular to the rotating shaft.

2. The link assembly according to claim 1, wherein
the support ring includes a plate shaped portion that
- is disposed inside the lip ring and
- extends outwardly with respect to the rotating shaft in the radial direction perpendicular to the axial direction.

3. The link assembly according to claim 1, wherein
the second member is rotatably supported by a coupling pin including the rotating shaft.

4. The link assembly according to claim 1, wherein
the seal housing is an annular recessed part formed on a surface of the first member, and the surface of the first member opposes the second member.

5. The link assembly according to claim 1, wherein
the seal housing is an annular recessed part formed on a surface of the second member, and the surface of the second member opposes the first member.

6. The link assembly according to claim 1, wherein
the first member is a first bush, and
the second member is a second bush.

7. The link assembly according to claim 1, wherein
the second member has a protruding part that protrudes inwardly toward the rotating shaft, and
the second lip part abuts the protruding part.

8. The link assembly according to claim 3, wherein
the second lip part overlaps a coupling line that links an axial center of a sprocket and an axial center of a coupling pin, as seen in a side view.

9. A seal assembly for sealing a joint that has a rotating shaft of crawler belt links, the seal assembly comprising:
a load ring; and
a seal ring that has a lip ring and a support ring,
the seal ring including
- a first lip part that is located on the lip ring and protrudes in an axial direction of the rotating shaft,
- a second lip part that is located on the lip ring and protrudes in a radial direction perpendicular to the rotating shaft, and
- an opposing surface that opposes the load ring and has a C-shaped cross-section, the lip ring abutting the load ring, and
the opposing surface including
- a first opposing surface that extends in the axial direction,
- a second opposing surface that is joined to the first opposing surface and is inclined with respect to the first opposing surface, and
- a third opposing surface that is joined to the second opposing surface and opposes the first opposing surface.

10. The seal assembly according to claim 9, wherein
the first lip part is positioned on an opposite side of the load ring in relation to the second opposing surface, and
the second lip part is positioned on a same side as the load ring in relation to the second opposing surface.

11. The seal assembly according to claim 9, wherein
the seal ring includes
a first seal ring that includes the first lip part, and
a second seal ring that includes the second lip part.

12. The seal assembly according to claim 9, wherein
the first lip part is formed in an annular shape, and
the second lip part is formed in an arc shape.

* * * * *